Patented Dec. 27, 1949

2,492,146

UNITED STATES PATENT OFFICE

2,492,146

PROCESS FOR REFINING POLYMERIZED ROSIN

Burt L. Hampton, Jacksonville, Fla., assignor, by mesne assignments, to The Glidden Company, Cleveland, Ohio, a corporation of Ohio No Drawing. Application February 23, 1946, Serial No. 649,776

12 Claims. (Cl. 260—97)

The present invention relates to improvements in rosin and particularly relates to a process for upgrading and refining polymerized rosin.

In the joint application Serial Number 431,836 filed February 21, 1942, now abandoned, in which I am one of the joint inventors, it was disclosed that when rosin is heated in the presence of small amounts of selenium, from .01 to 1.0%, the product is stabilized against oxidation and also the product is lighter in color than the starting rosin. The present invention is an extension of the joint teaching thereof.

An object of the present invention is to provide a process of improving polymerized rosin.

Another object is to provide a process for upgrading polymerized rosin.

A further object is to produce a polymerized rosin of improved grade which does not show fluorescence or bloom.

I have now found that if rosin, which has been polymerized is heated with small amounts of selenium, the color of the rosin is improved. Furthermore, I have found that this heat treatment with selenium stabilizes the polymerized rosin beyond that which is effected in the ordinary polymerization process. Such stabilization is believed to result from aromatization of not substantially more than one ring of some of the polymerized rosin molecules as well as from similar aromatization of unpolymerized rosin contained in the polymerized material. I prefer to carry out the selenium treatment in the presence of small amounts of added acid, either organic or inorganic, which is stronger than abietic and other rosin acids, as this treatment prevents fluorescence or bloom caused by the selenium treatment if the polymerized rosin contains metals. Where the polymerized rosin is free of metals, this acid treatment may not be required to prevent bloom, but, nevertheless, it is good practice to employ such treatment if freedom from bloom is desired, especially when the treatment is being carried out in a metal receptacle. The presence of the acid, however, does not seem to aid the selenium decolorization.

The temperatures employed may vary over a considerable range. Below about 250° C., however, the action is slow, while the temperatures above 350° C. are apt to cause excessive decarboxylation, and therefore should generally be avoided. Also the decolorizing action of the selenium may be nullified by excessive heating at higher temperatures. Preferred temperatures are from about 260° C. to 310° C. It is also preferred in practice to carry out the heating with selenium in two stages. In the first stage the reaction mixture is heated in the absence of any sparging gases. In the second stage the heating is continued at temperatures ranging from about 250° C. to about 285° C. and steam or other inert sparging gas is passed through the reaction mixture to remove volatile reaction products. In some instances it is beneficial to provide an inert atmosphere, such as carbon dioxide, during the first stage, and also while cooling the product after the second stage. An inert atmosphere during the second stage is unnecessary because the sparging gases and the volatile products of reaction provide adequate portection.

The amounts of selenium required to produce improvement in color are quite small. Amounts of from 0.01 to 1.0% may be used but it has been found that amounts of from .05 to 0.3% are to be preferred generally. In place of free selenium, selenium compounds such as selenium dioxide or selenium halides, which form free selenium during the treatment, may be used. When selenium halides are used, smaller amounts of added acid may be used, if at all.

The time of the heating may also vary. Generally, from one-half to three hours is sufficient for the first stage treatment. The time, of course, is somewhat dependent upon the amount of selenium and the temperature. The time, however, should not be so long as to cause excessive decarboxylation under the other conditions existing. It should also be kept in mind that when the sparging treatment is employed, as a second stage, some of the volatile products contain selenium and that during this sparging operation the selenium is gradually being removed. Fifteen to thirty minutes is generally sufficient for the sparging treatment, although it may be longer or shorter, or eliminated altogether if desired.

In general, the minimum over-all time for the treatment including any sparging should be at least about thirty minutes at the preferred temperatures, the maximum, of course, being that which produces undesired decarboxylation.

Among the acids which are stronger than rosin acids and which may consequently be used herein, may be mentioned phosphoric, acetic, sulfuric, stearic, formic, hydrochloric and oxalic. The amounts required are quite small, 5% of acid by weight of the rosin being sufficient for the very weaks acids, such as stearic, propionic, malonic, and the like, and lesser amounts being sufficient for stronger acids. From .008% to .015% of such strong acids as phosphoric, sulfuric, hydrochloric is generally adequate while from .1% to .4% of acids such as acetic, formic and oxalic is preferred. Amounts of more than 1% of these latter acids should be avoided since greater amounts are apt to cause destruction of the rosin. In selecting any acid, care should be taken to insure that the strength and amount of the acid is insufficient to cause any substantial destruction of the rosin during treatment. Tall oil may be used as a source of fatty acid where such acids are desired.

The following examples are intended as illustrative of preferred modifications of the invention.

EXAMPLE I

Polymerized rosin of grade N, M. P. 100° C. (R. & B.) and A. N. 154, was heated with 0.15% selenium at 270–278° C. for one hour and then steamed at 265–275° C. for twenty minutes, after which the mass was cooled to 210° C. while continuing the steaming. The product graded X, had a melting point of 94° C. and an acid number of 146.

EXAMPLE II

K grade polymerized rosin, M. P. 95° C. and A. N. 152 was heated with 0.15% selenium at 275–285° C. for one hour and steamed gently at 265–275° C. for thirty minutes and cooled to 180° under carbon dioxide to give a product of WG grade, A. N. 144 and M. P. 90° C.

EXAMPLE III

N grade polymerized rosin, M. P. 100° C., A. N. 154 was heated to about 200° C. and 0.2% selenium and about .008% of 85% phosphoric acid added. The reaction mass was then heated at 275–280° C. for one hour and steamed at 270–280° C. for thirty minutes to give a product of WW to X grade, A. N. 152, and M. P. 96.

EXAMPLE IV

I grade polymerized rosin, M. P. 100° C., A. N. 155 was heated at 275–285° C. for one hour with 0.2% selenium and about .008% of 85% phosphoric acid, and then steamed at 275–285° C. for thirty minutes. Grade N, M. P. 98° C.; A. N. 146.

EXAMPLE V

N grade polymerized rosin, M. P. 102, A. N. 144, was heated to about 200° C. and 0.10% selenium was added to the molten resin which was then heated to 275–285° C. for one hour and then steamed at this temperature for thirty minutes. The product grade WW, M P. 94° C.; A. N. 137; and (alpha)$_D$+17°.

EXAMPLE VI

The procedure was the same as in Example V except that about 0.008% of 85% phosphoric acid was added. The product graded WW, A. N. 136, M. P. 95, (alpha)$_D$+13°.

EXAMPLE VII

The procedure was the same as an Example V except that the amount of selenium was reduced to 0.05%. The product graded WG; A. N. 138; M. P. 99.5; (alpha)$_D$+7°.

EXAMPLE VIII

The same rosin as used in the three previous examples was heated to about 180° C. and 0.3% selenium added, after which the mixture was heated at 275–285° C. for two hours and then steamed at 265–275° C. for thirty minutes. The product graded WG–WW; A. N. 137, M. P. 93°, (alpha)$_D$+21°.

The increased severity of the selenium treatment in this sample resulted in somewhat increasing the positive optical rotation of the product, thereby indicating greater stability, but the increase was not as great as in the case of unpolymerized rosin treated similarly.

EXAMPLE IX

A polymerized rosin grading N–WG, A. N. 133, M. P. 106.5, was heated with .15% selenium at 290–295° C. for thirty minutes and then steamed for twenty minutes. The product graded WW; A. N. 129; M. P. 105°.

EXAMPLE XI

N grade polymerized rosin, M. P. 118.5°, A. N. 132, prepared from a WG gum rosin, was divided into various portions and each subjected to a different heat treatment with .15% selenium. Each portion was steamed at 265–275° C. for thirty minutes, following the indicated heat treating. The variations in the procedure and product are shown in the table.

Table

| Experiment | Temp. of Heating, °C. | Time of Heating | Percent $H_3PO_4$ | Grade | A. N. | M. P. |
|---|---|---|---|---|---|---|
| 1 | 275–285 | 1 hr | None | WW | 130 | 116 |
| 2 | 275–285 | 1 hr | .008 | WW | 125 | 109 |
| 3 | 275–285 | 30 min | None | WW– | 130 | 110.5 |
| 4 | 293–300 | 1 hr | None | WW– | 127 | 111 |

It will be readily apparent from the foregoing examples that the treatment of polymerized rosin according to the present invention results in considerable upgrading of polymerized rosin. The polymerization procedures which are ordinarily employed result in a considerable lowering of the grade and it is known that in all of the foregoing examples, except Example IX, the undisclosed polymerization procedures did result in a lowering of the grade. However, in all instances the products resulting from the herein described treatments were lighter in color than the original polymerized rosin and at least as light as the unpolymerized rosin from which was obtained the polymerized rosins. Thus the present invention makes it possible to produce a polymerized rosin of at least as high a grade as the original rosin.

In the following claims the term "free selenium" is used to refer to the selenium which is available for the herein disclosed purposes whether it is elemental selenium or is derived from selenium compounds.

Having described the invention, what is claimed is:

1. The process for refining polymerized rosin which comprises heating a polymerized rosin with from 0.01 to 1% of free selenium at a temperature of 250° to 350° C. for a time of at least about thirty minutes but insufficient to cause substantial decarboxylation.

2. The process for refining polymerized rosin which comprises heating a polymerized rosin with from 0.01 to 1% of free selenium at a temperature of 260° to 310° C. for from thirty minutes to three hours.

3. The process for refining polymerized rosin which comprises heating a polymerized rosin with from about 0.05% to 0.3% of free selenium at a temperature of 260–310° C. for from thirty minutes to three hours.

4. The process for refining polymerized rosin which comprises heating a polymerized rosin with from .01 to 1% of free selenium and with a small amount of acid stronger than abietic acid at a temperature of 250° C. to 350° C. for a time of at least about thirty minutes but insufficient to cause substantial decarboxylation.

5. The process for refining polymerized rosin which comprises heating polymerized rosin with from .01 to 1% of free selenium and with a small amount of acid stronger than abietic acid at a temperature of 260° to 310° C. for from thirty minutes to three hours.

6. The process for refining polymerized rosin which comprises heating polymerized rosin with from .05 to 0.3% of free selenium and with a small amount of acid stronger than abietic acid at a temperature of 260° to 310° C. for from thirty minutes to three hours.

7. The process of claim 1 which includes the additional step of sparging the treated rosin with steam at temperatures of between about 250° C. and 285° C. for about thirty minutes.

8. The process of claim 2 which includes the added step of sparging the treated rosin with steam at temperatures of between about 250° C. and 285° C. for about thirty minutes.

9. The process of claim 3 which includes the added step of sparging the treated rosin with steam at temperatures of between about 250° C. and 285° C. for about thirty minutes.

10. The process of claim 4 which includes the added step of sparging the treated rosin with steam at temperatures of between about 250° C. and 285° C. for about thirty minutes.

11. The process of claim 5 which includes the added step of sparging the treated rosin with steam at temperatures of between about 250° C. and 285° C. for about thirty minutes.

12. The process of claim 6 which includes the added step of sparging the treated rosin with steam at temperatures of between about 250° C. and 285° C. for about thirty minutes.

BURT L. HAMPTON.

REFERENCES CITED

The following references are of record in the file of this patent:

UNITED STATES PATENTS

| Number | Name | Date |
| --- | --- | --- |
| 2,241,341 | Ender | May 6, 1941 |
| 2,298,916 | Auer | Oct. 12, 1942 |
| 2,359,404 | Colgate et al. | Oct. 3, 1944 |
| 2,407,248 | Borglin | Sept. 10, 1946 |

Certificate of Correction

Patent No. 2,492,146                                December 27, 1949

BURT L. HAMPTON

It is hereby certified that error appears in the printed specification of the above numbered patent requiring correction as follows:

Column 4, in the table, last column thereof, for "110.5" read *119.5*;

and that the said Letters Patent should be read with this correction therein that the same may conform to the record of the case in the Patent Office.

Signed and sealed this 11th day of April, A. D. 1950.

[SEAL]

THOMAS F. MURPHY,
*Assistant Commissioner of Patents.*